United States Patent [19]

Iki et al.

[11] Patent Number: 6,008,802
[45] Date of Patent: Dec. 28, 1999

[54] METHOD AND APPARATUS FOR AUTOMATICALLY PERFORMING A FUNCTION BASED ON THE RECEPTION OF INFORMATION CORRESPONDING TO BROADCAST DATA

[75] Inventors: Jean Goldschmidt Iki, San Jose; Anthony A. Shah, Santa Clara; Kenneth Alan Moore, Fremont; David N. Hackson, Sunnyvale, all of Calif.

[73] Assignee: Intel Corporation, Santa Clara, Calif.

[21] Appl. No.: 09/001,957

[22] Filed: Jan. 5, 1998

[51] Int. Cl.$^6$ ....................................................... H04N 7/00
[52] U.S. Cl. .......................... 345/327; 348/460; 348/906; 455/4.2; 455/6.3
[58] Field of Search .................................... 345/327, 328; 348/569, 564, 734, 10, 553, 460, 906, 5.5, 7, 8, 12, 13, 1, 705, 706; 455/2, 4.2, 5.1, 6.3

[56] References Cited

U.S. PATENT DOCUMENTS

| | | |
|---|---|---|
| 4,706,121 | 11/1987 | Young . |
| 5,353,121 | 10/1994 | Young et al. . |
| 5,428,774 | 6/1995 | Takahashi et al. . |
| 5,465,113 | 11/1995 | Gilboy ........................................ 348/5.5 |
| 5,481,296 | 1/1996 | Cragun et al. ............................ 348/13 |
| 5,499,050 | 3/1996 | Baldes et al. . |
| 5,499,103 | 3/1996 | Mankovitz . |
| 5,521,841 | 5/1996 | Arman et al. . |
| 5,546,191 | 8/1996 | Hibi et al. . |
| 5,621,579 | 4/1997 | Yuen . |
| 5,635,978 | 6/1997 | Alten et al. . |
| 5,640,484 | 6/1997 | Mankovitz . |

Primary Examiner—Victor R. Kostak
Attorney, Agent, or Firm—Blakely, Sokoloff, Taylor & Zafman LLP

[57] ABSTRACT

In accordance with the teachings of the present invention, a method and apparatus for automatically performing a function based on the reception of information corresponding to broadcast data is provided. In one embodiment, an apparatus includes a receiver to receive information corresponding to broadcast data, a control logic to compare the information to target data, and a programming guide to store programming information. The control logic accesses the programming guide if at least a portion of the information matches at least a portion of the target data. The control logic then performs a predetermined function based on accessing the programming guide.

31 Claims, 7 Drawing Sheets

FIGURE 4

| MEDIUM | CH | 12AM (News) | 12:30A (Comedy) | 1:00A (Comedy) | ... | 10:00P (Drama) | 10:30P (Drama) | 11:00P (News) | 11:30P (News) |
|---|---|---|---|---|---|---|---|---|---|
| CABLE | 1 | | | | ... | | | | |
| | 2 | | | | ... | | | | |
| | ... | | | | ... | | | | |
| SATELLITE | | | | | | | | | |
| AUDIO | | | | | | | | | |

215

DAYS OF THE MONTH
DAYS OF THE WEEK
M-SU 1-31

JORDAN + BASKETBALL + NBC

STOCK + WEBPAGE ADDRESS

PRINCESS DIANA + NEWS

RECORD UNTIL END, IF CURRENTLY BROADCASTING
SCHEDULE TO RECORD, IF NOT YET BROADCAST

| USER NAME | CH | VOL | GENRE | BLOCK | SUPP-PROG | INTERNET | AUTO-FEATURE | STATIONS | TYPE | VOL | | | |
|---|---|---|---|---|---|---|---|---|---|---|---|---|---|
| | | | TELEVISION | | | COMPUTER | | AUDIO COMPONENTS | | | | | 700 |
| JOE | 2 | o | S | NONE | NONE | GAMES | CLOCK | 750KHZ | J | - | • | •• | •• |
| | 5 | + | M | NONE | NONE | SPORTS | BIRTHDAY REMINDERS | 800KHZ | P | • | • | • | ⋮ |
| | 7 | - | Mv | V++ | NONE | FINANCIAL | | 1.2MHZ | R | • | • | • | ⋮ |
| | 11 | o | N | NONE | Q | ••• | ••• | 1.195MHZ | J | • | • | • | ⋮ |
| | ••• | ••• | ••• | ••• | ••• | ••• | ••• | ••• | ••• | ••• | ••• | ••• | ⋮⋮⋮ |
| USER | ••• | ••• | ••• | ••• | ••• | ••• | ••• | ••• | ••• | ••• | ••• | ••• | ⋮⋮⋮ |
| •••• | | | | | | | | | | | | | |

KEY:
VOLUME: "+"-HIGH "o"-MEDIUM "-"-LOW
S-SPORTS
M-MUSIC
Mv-MOVIES
N-NEWS
Q-QUOTES
P-POP
R-ROCK
J-JAZZ

METHOD AND APPARATUS FOR AUTOMATICALLY PERFORMING A FUNCTION BASED ON THE RECEPTION OF INFORMATION CORRESPONDING TO BROADCAST DATA

BACKGROUND OF THE INVENTION

1. Field of the Invention

The present invention pertains to the field of media technology. More particularly, this invention relates to the art of performing a function based on the reception of information corresponding to broadcast data.

2. Background

Numerous advances in media technology have been made in recent years. The number of media sources has increased, and the volume of information from each source has increased. For example, innovations include internet "appliance" devices used with televisions to access the internet, digital satellite broadcasts which can provide a viewer with hundreds of channels of audio and video programming, and home computer packages designed especially for audio/video applications. As media technology progresses, the lines between video, audio, and interactive media become more obscure. An individual may become overwhelmed with the flood of information and entertainment available.

Innovations have also made media information more accessible and meaningful to a wider range of users. For example, subsidiary or hidden information, such as closed caption text, can be synchronously broadcast with a television program so that the closed caption text corresponds to the dialogue of the program. Real time closed captioning is also frequently available for live broadcasts.

Other examples of innovations which take advantage of subsidiary information include toys for children. A toy can be placed near a television which is receiving subsidiary information. The toy can receive the subsidiary information from the television, and be programmed to respond accordingly. For instance, a stuffed animal toy can be sold with a video tape of children's songs with corresponding subsidiary information. The toy could be made to sing along with the songs as the video tape is played on the television.

The programming guide is another innovation in media technology designed to help a user sort through the mass of media choices. Many cable providers broadcast a programming guide on a cable channel. A viewer can select the channel and view a scrolling grid which displays the channel, time, and title of programming scheduled for the immediate future. Some programming guides also display codes that allow a user to select a particular program to view or record. For example, a viewer may be able to order a pay-per-view program or program a video cassette recorder to record a selected program from the codes in the programming guide. A programming guide may also provide a viewer with rating information so that unsuitable programming can be identified.

A need remains, however, to provide additional means by which a user can recognize and select pertinent information and entertainment from the onslaught of massive volumes of information. Therefore, it would be beneficial to provide a method and apparatus that takes advantage of these and other innovations in media technology to automatically perform predetermined functions to improve a user's access to relevant information and preferred entertainment.

SUMMARY OF THE INVENTION

In accordance with the teachings of the present invention, a method and apparatus for automatically performing a function based on the reception of information corresponding to broadcast data is provided. In one embodiment, an apparatus includes a receiver to receive information corresponding to broadcast data, a control logic to compare the information to target data, and a programming guide to store programming information. The control logic accesses the programming guide if at least a portion of the information matches at least a portion of the target data. The control logic then performs a predetermined function based on accessing the programming guide.

BRIEF DESCRIPTION OF THE DRAWINGS

Examples of the present invention are illustrated in the accompanying drawings. The accompanying drawings, however, do not limit the scope of the present invention in any way. Like references in the drawings indicate similar elements.

FIG. 4 illustrates one embodiment of a programming guide;

FIG. 5 illustrates one embodiment of target data;

FIG. 6 illustrates one embodiment of predetermined functions;

FIG. 7 illustrates one embodiment of a user profile;

DETAILED DESCRIPTION

In the following detailed description, exemplary embodiments are presented in connection with the figures and numerous specific details are set forth in order to provide a thorough understanding of the present invention. However, it will be understood by those skilled in the art that the present invention may be practiced without these specific details, that the present invention is not limited to the depicted embodiments, and that the present invention may be practiced in a variety of alternate embodiments. Accordingly, the innovative features of the present invention may be practiced in a system of greater or lesser complexity than that of the system depicted in the figures. In other instances well known methods, procedures, components, and circuits have not been described in detail.

Figure 1:
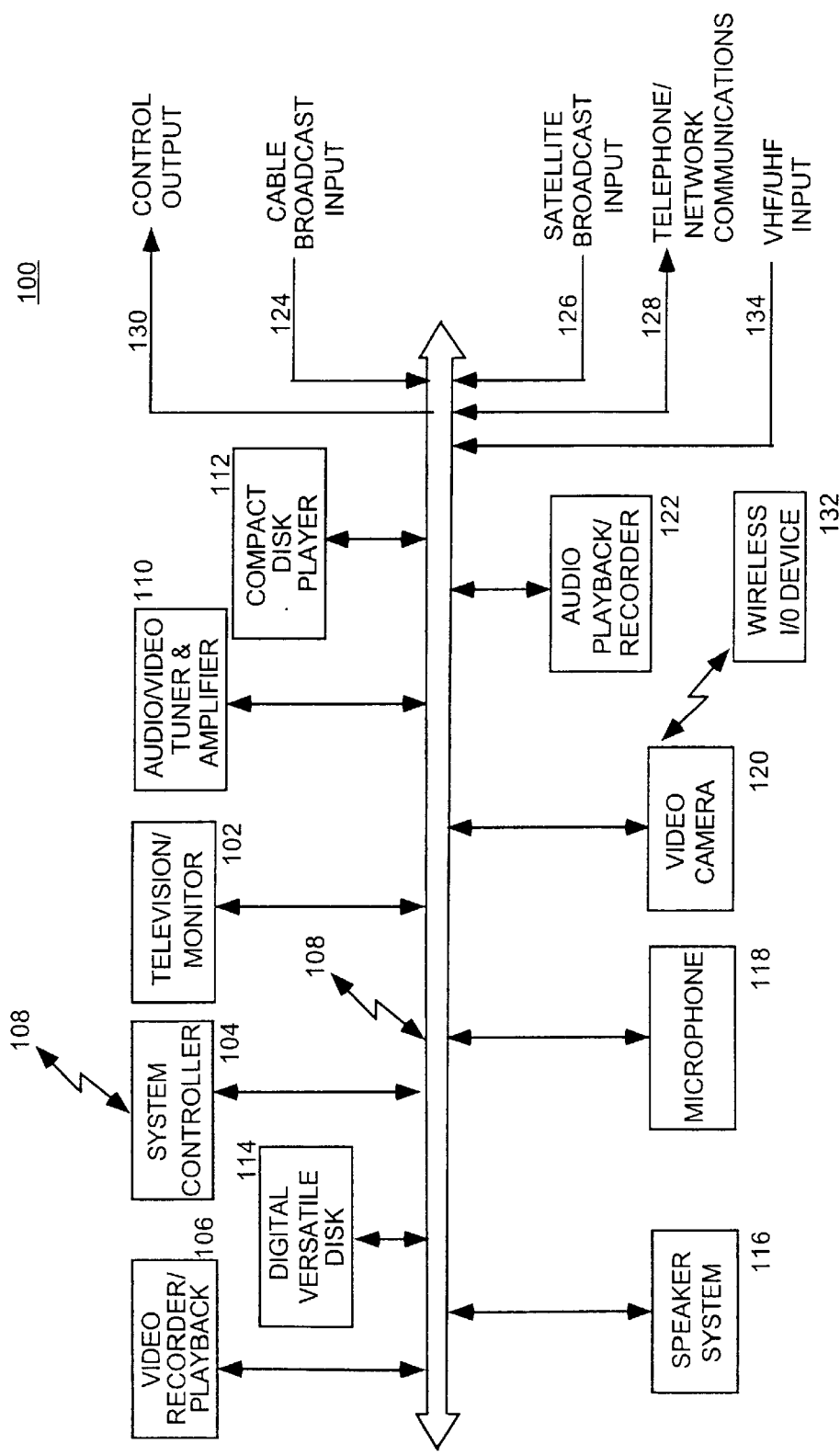
FIG. 1 is a block diagram illustrating a number of components making up a media system in which the present invention may be practiced.

FIG. 1 is a block diagram illustrating one example of a media system with which the present invention may be practiced. As will be discussed in greater detail below, system 100 includes system controller 104 which, in one embodiment, is configured to receive information corresponding to broadcast data. The information is used by system controller 104 to identify a predetermined function, such as automatically recording a broadcast. The information can be in the form of subsidiary information or hidden information such as closed caption text, stock quotes, time and temperature, the title, rating, and elapsed time of a currently running program, and a variety of other embedded signals. The information can also be part of the video or audio signal, such as a graphical representation or a segment of music.

In one embodiment, system controller 104 may be a computer system incorporated with the teachings of the present invention, as well be discussed in further detail below. System controller 104 may also be a "set-top" box having the necessary processing power to exercise the teachings of the present invention. Regardless of the particular embodiment, system controller 104 may also be referred to as a "convergence system" designed to integrate the world of media systems and computing platforms to achieve the beneficial results discussed in greater detail below.

In the illustrated embodiment, system 100 includes television/monitor 102, video recorder/playback device 106, digital versatile disk (DVD, also referred to as digital video disk) recorder/playback device 114, audio/video tuner and amplifier 110, audio playback/recorder device 122 and compact disk player 112, all coupled to a common input/output (I/O) bus 108.

It is to be appreciated that the use of the common I/O bus 108 is for ease of explanation in the diagram only, and that a number of alternative means of routing input and output signals may be beneficially employed. For example, audio input and output could be routed with an appropriate number of independent audio "patch" cables, video signals may be routed with independent coaxial cable, and control signals may be routed along a two-wire serial line, or through infrared (IR) communication signals or radio frequency (RF) communication signals.

In addition, system 100 includes speaker system 116, microphone 118, video camera 120, and a wireless input/output device 132. Wireless I/O control device 132 can be an entertainment system remote control unit which communicates with the components of system 100 through IR signals. Alternatively, wireless I/O control device 132 may be a wireless keyboard and cursor position device that communicates with the components of system 100 through IR signals or RF signals. In yet another embodiment, wireless I/O control device 132 may be an IR remote control device similar in appearance to a typical entertainment system remote control. Wireless I/O control device 132 may also be fitted with a track-ball, which allows a user to position a cursor within a user interface display of system 100.

System controller 104 is also configured to control a wide variety of features associated with each of the system components. As depicted, system controller 104 is coupled to each of the system components, as necessary, through I/O bus 108. In one embodiment, in addition to or in place of I/O bus 108, system controller 104 may be configured with a wireless communications transmitter (or transceiver), which is capable of communicating with the system components via IR signals or RF signals 108'. Regardless of the control medium, system controller 104 is configured to control each of the entertainment system components of system 100, although it is understood that each of the components may be individually controlled with wireless I/O device 132.

As illustrated in FIG. 1, system 100 can be configured to receive media input from a wide variety of sources. In one embodiment, for example, system 100 receives programming input from any or all of the following sources: cable broadcast 124, satellite broadcast 126 (e.g., via a satellite dish), very high frequency (VHF) or ultra high frequency (UHF) radio frequency communications of television broadcast networks and radio stations 134 (e.g., via an aerial antenna), and/or telephone/computer network interface 128. Telephone/computer network interface 128 includes, but is not limited to, telephone network broadcast input and modem communications. Further, it will be appreciated by one skilled in the art, that cable broadcast input 124, satellite broadcast input 126, VHF/UHF input 134, and telephone/computer network interface 128 may beneficially receive input from digital broadcast programming and digital cable programming, such as, but not limited to, digital TV.

In addition to programming input, system 100 is also configured with a number of general purpose control outputs 130 which may be configured to control any number of devices. In one embodiment, for example, as system controller 104 configures system 100 to display a movie, it may also dim the lights in the room to a predetermined level to further enhance the viewing environment. Control circuitry which allow a computer system to control, for example, lighting, thermostat settings, and other household appliances are well known in the art and thus will not be described further.

In another embodiment, system controller 104 analyzes programming content and configures system 100 to take full advantage of the programming. For example, if a television show is being broadcast in surround sound, system controller 104 determines that the program is offered in surround sound and configures system 100 to display the television show in surround sound. If the next show televised on the network is not broadcast in surround sound, system controller 104 determines this and configures system 100 to display the television show in stereophonic or monophonic sound, as appropriate.

It is also to be appreciated that the media system components depicted in FIG. 1 can be beneficially combined. For example, system controller 104 could be integrated into television/monitor 102, DVD 114, or audio/video tuner and amplifier 110.

Figure 2:
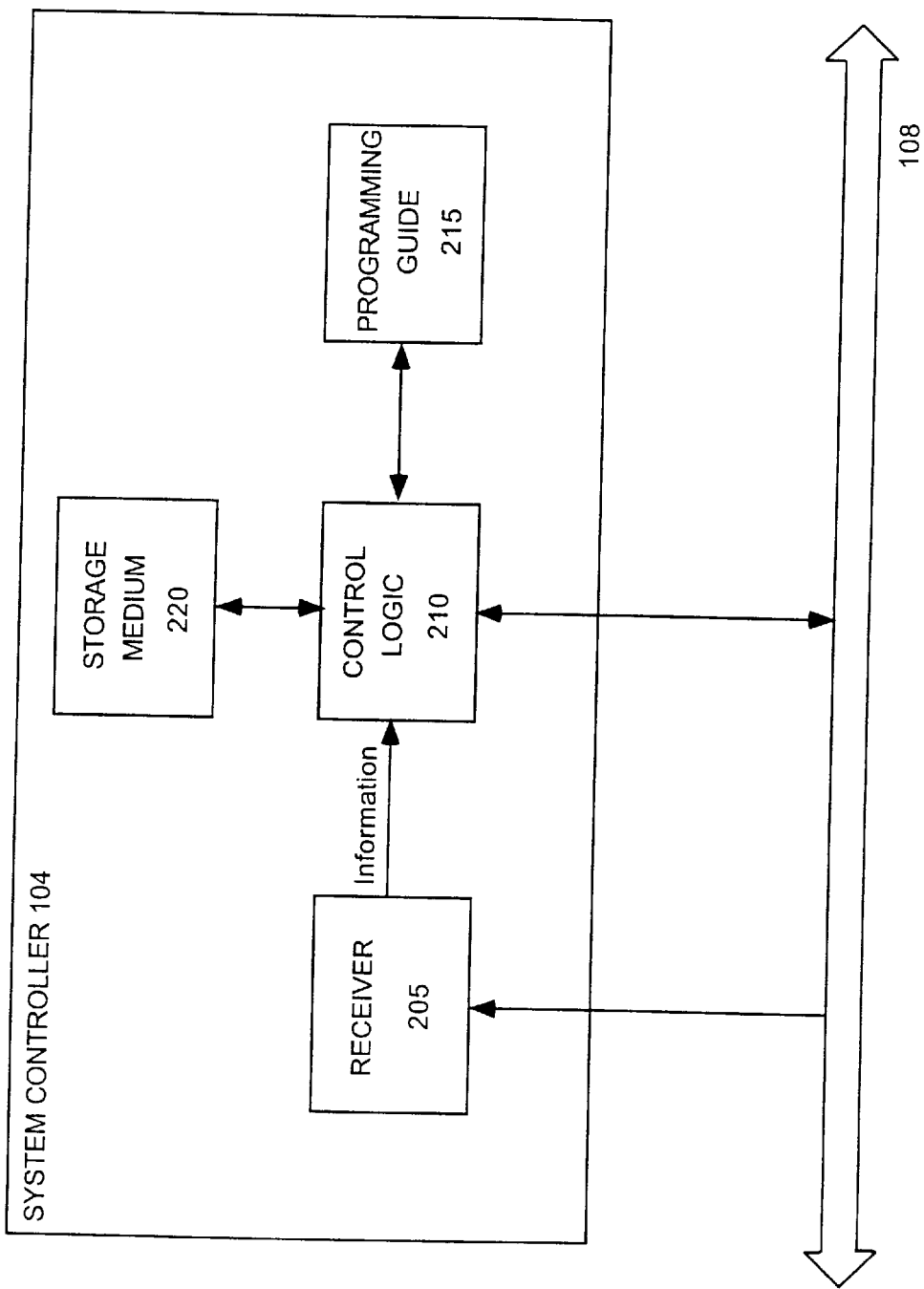
FIG. 2 is a block diagram illustrating a system controller which may be used to practice one embodiment of the present invention.

FIG. 2 illustrates a system controller 104 according to one embodiment of the present invention. The functionality of system controller 104 can be implemented in software and executed on a processor, as discussed further below, or implemented in hardware. System controller 104 includes receiver 205, control logic 210, programming guide 215, and storage medium 220, all communicatively coupled as shown. Receiver 205 and control logic 210 are also coupled to I/O bus 108. In alternate embodiments, programming guide 215 could be stored in storage medium 220, and receiver 205 could be combined with audio/video tuner and amplifier 110.

Figure 3:
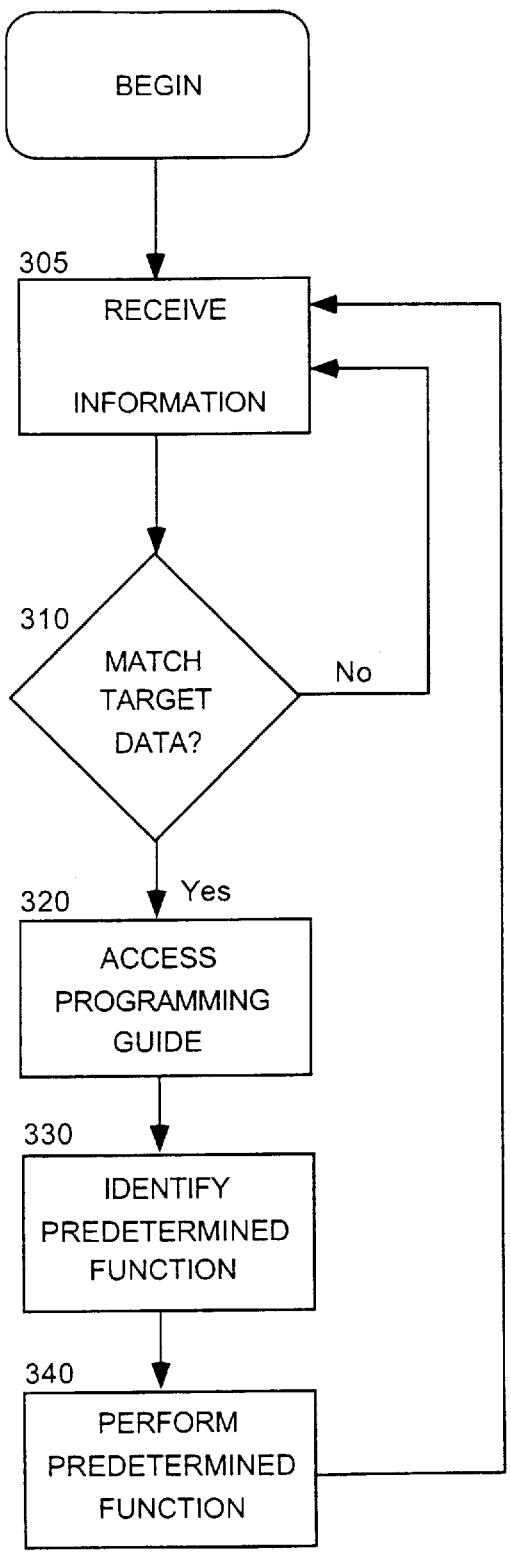
FIG. 3 is a flow chart illustrating the steps followed in determining when a predetermined function is to be performed according to one embodiment of the present invention.

FIG. 3 is a flow chart illustrating the method of one embodiment of the present invention. Receiver 205 continually receives information corresponding to broadcast data in block 305. In decision block 310, control logic 210 compares the information to target data until it determines that at least a portion of the information matches at least a portion of the target data. If there is a match, control logic 210 accesses programming guide 215 in block 320. In block 330, control logic 210 then identifies a predetermined function based on the accessing, and performs the predetermined function in block 340. The process is repeated each time a match is determined.

Returning to FIG. 2, receiver 205 receives information corresponding to broadcast data being received by system 100 via one or more of input sources 124, 126, 128, and 134. The information can include, but is not limited to, aspects of audio and/or video signals, closed caption text or Intercast™ data broadcast via the vertical blanking interval (VBI), or information received via one input source, such as a digital channel or telephone connection, wherein the information corresponds to a program received via a different input source or a different channel of the same input source. The information is then provided to control logic 210.

Control logic 210 compares the subsidiary information to target data stored in storage medium 220. Target data are comprised of a set of key words, phrases, characters, or any other form of data that may be received by system 100 in the form of information corresponding to broadcast data. For instance, control logic 210 may compare closed caption text, video patterns, and audio patterns to the target data.

FIG. 5 illustrates an example target data list. If, for example, the information being received was closed caption text, control logic 210 would compare the closed caption text to text in the target data. In this example, the user is interested in "Jordan" in connection with "Basketball" in connection with "NBC." The user is also interested in "stock" in connection with a webpage address, wherein "webpage address" may be an identifier indicating any closed caption text in the format of a webpage address, such as a uniform resource locator (URL). Similarly, in the next line of target data, the user is interested in "Princess Diana" in connection with news, wherein "news" may be an identifier indicating a category of programming. Countless different forms of target data are possible. For instance, target data could include a graphical representation, such as the NBC peacock or the graphical display of a title of a program, such as "20/20."

For the third target data entry, if the words "Princess Diana" were received by receiver 205 in the form of closed caption text or an audio signal, control logic 210 would recognize a match between at least a portion of the information corresponding to broadcast data and a portion of the target data. When a match is recognized by control logic 210, control logic 210 accesses programming guide 215.

FIG. 4 illustrates one example of the contents of programming guide 215. In the illustrated example, programming guide 215 contains channel and time information for programs received via cable, satellite, and audio inputs. Programming is stored for days of the week and days of the month. The programming guide can also categorize programs, as shown for channel 1 in FIG. 4. So, for instance, when the words "Princess Diana" are matched to the target data, control logic 210 can access programming guide 215 to ascertain the category of the corresponding program. If the program is a news program, control logic 210 will identify a predetermined function.

FIG. 6 illustrates one example of a set of predetermined functions stored in storage medium 220. If "Princess Diana" was mentioned during a currently broadcasting news program, control logic 210 would instruct video recorder/playback device 106 or DVD device 114 to record the program until the end of the program. The end of the program can be identified using programming guide 215.

If "Princess Diana" was mentioned in connection with a news program scheduled in the future, control logic 210 would identify another predetermined function to schedule the program to be recorded. The predetermined function could involve several steps. For example, if the words "Princess Diana" were received within a certain time frame of the graphical representation of "20/20" or within a certain word count of the closed caption text "20/20," control logic 210 could access programming guide 215 to identify "20/20" as a news program. Then, if 20/20 is not currently broadcasting, control logic 210 could identify from programming guide 215 a given number of times during which Dateline is scheduled to air. Based on the assumption that a segment about Princess Diana will air during at least one of those scheduled broadcasts, control logic 210 can schedule one or more of the programs to be recorded, or just flag the programs for future use. In this second situation, control logic 210 could monitor information corresponding to the flagged programs when they air to record only the segments about Princess Diana.

Target data can come from any number of different sources. A user can enter target data manually via a user interface, download the target data from the internet, read it off a computer disk, receive it via the VBI, or receive it from any number of other sources. Target data could also be generated by control logic 210 based on a user profile as discussed more fully below.

Like target data, the contents of the programming guide can come from a number of different sources. Programming guide 215 can be updated on a regular basis. For instance, a user could receive a computer disk or CD ROM once a month containing monthly programming schedules. A user could download the information from the internet or a dial-in service on a weekly basis. The information could also be downloaded automatically by control logic 210 on a daily basis, for example, at a specified time, over a specified cable channel. The information could also be received in real time as subsidiary information corresponding to a broadcast. For example, the programming information could be updated via the VBI, providing a schedule of segments within a corresponding program, such as the schedule for commercial breaks, interview segments, periods of a sporting event, or the length of a music video. During live broadcasts, the programming information could be updated on an on-going basis, with scheduling information downloaded every second if needed. The scheduling information could include a time signal so that control logic 210 could synchronize actions to the broadcaster's time frame.

The programming guide could also include scheduling information for commercials and promotions. In this case, if "Princess Diana" appeared in the closed caption text of a news program promotion, control logic 210 could access programming guide 215 to discover that the text appeared during a scheduled promotion for a particular news program and identify the time and channel for the actual show. Then control logic 210 could identify a predetermined function to take. For example, control logic 210 could configure system 100 to record the future news program. It could also provide an indicator to alert the user of the news program by, for instance, displaying an icon on television/monitor 102 or providing an audio tone over speaker system 116. If, instead, the user did not want to see news stories about Princess Diana, control logic 210 could block reception of the news program.

Assuming that the user is interested in viewing only the Princess Diana segment of the news program, control logic 210 could flag that news program for future use. Then, when the program airs, control logic 210 can download the schedule for segments within the program, and configure system 100 to record or block only the Princess Diana segment. In order to be certain to record all of the relevant information, control logic 210 could add a small time buffer at the beginning and end of recording. This is especially important where system 100's clock is operating independent from the broadcaster's clock.

For the "stock" and "webpage address" target data shown in FIG. 5, control logic 210 could recognize a match when the word "stock" is received within a predetermined distance from a webpage address. Then control logic 210 could access programming guide 215 to ascertain whether or not system 100 has internet access. If the system does, control logic 210 can identify a predetermined function. For example, control logic 210 could store the webpage address and alert the user, block access to the webpage address, or access the webpage address at the current time.

In other embodiments, target data, predetermined functions, and the selection of programming information to download into the programming guide can be determined based on a user profile. FIG. 7 illustrates one example of a user profile. The profile could be stored in storage medium 220 and contain information about a user's most and least favorite programs, computer topics, and radio selections. Control logic 210 could automatically monitor the input sources, and based on the profile, prioritize viewing, recording, and blocking of programming.

For example, the user profile may indicated that the user's favorite National Football League (NFL) team is the Pittsburgh Steelers. In which case, control logic 104 could create a target data entry for the Pittsburgh Steelers, download programming guide information for all NFL programs, and create a predetermined function entry to record or program to record when a match is determined.

Except for the incorporated teachings of the present invention, system controller 104 is intended to represent a broad category of computer systems known in the art. An example of such a computer system is a desktop computer system equipped with a high performance microprocessor (s), such as the Pentium® processor, Pentium® Pro processor, or Pentium® II processor manufactured by and commonly available from Intel Corporation of Santa Clara, Calif., or the Alpha® processor manufactured by Digital Equipment Corporation of Manard, Mass. Such computer systems are commonly equipped with a number of audio and video input and output peripherals and interfaces, which are also known in the art, for receiving, digitizing, and compressing audio and video signals. It is to be appreciated that the housing size and design for system controller 104 may be altered, allowing it to better visually fit into system 100.

Figure 8:
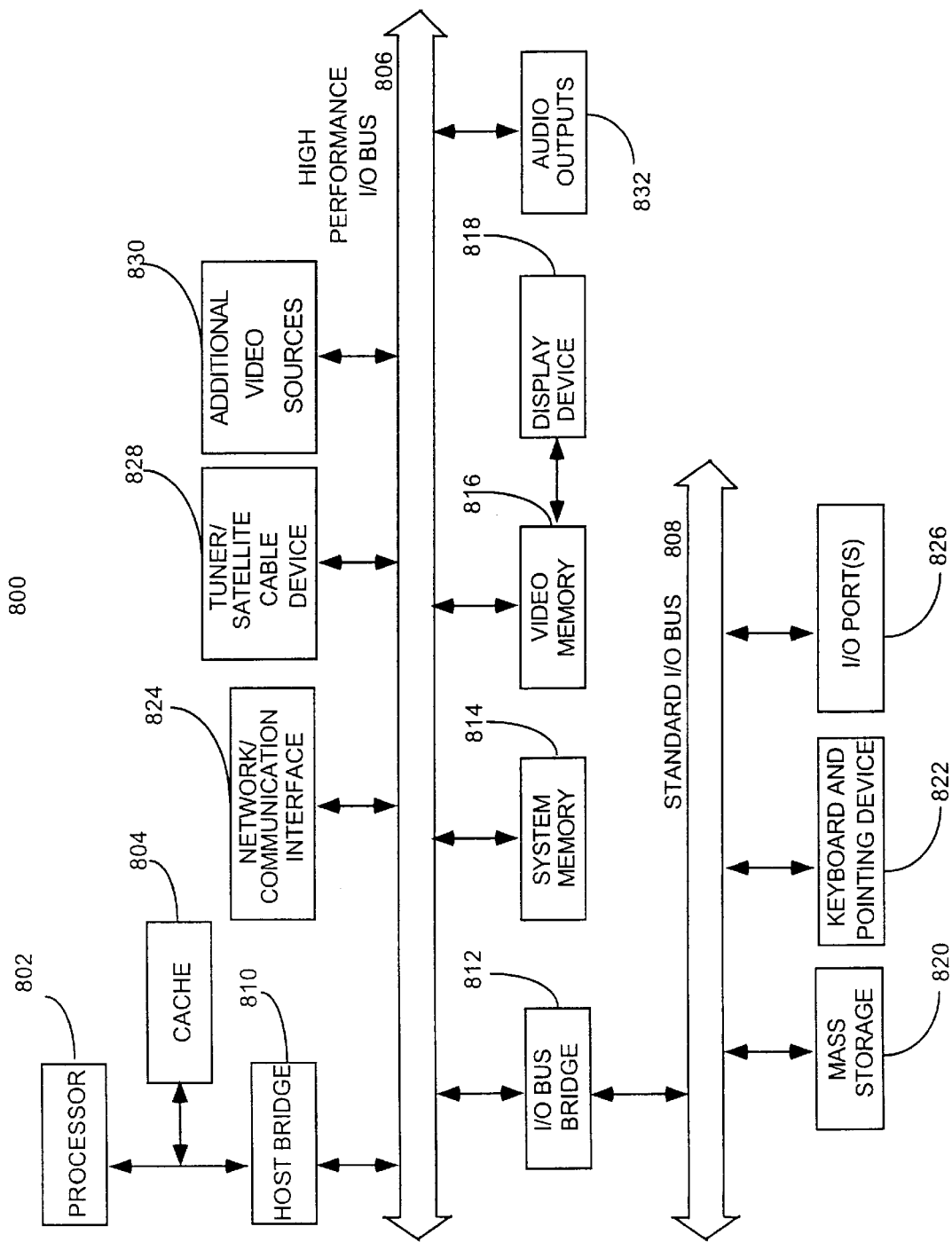
FIG. 8 illustrates another embodiment of a hardware system suitable for use with the present invention.

FIG. 8 illustrates one embodiment of a hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 is mass storage 820, keyboard and pointing device 822, and I/O ports 826. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 806. As illustrated, analog tuner/digital satellite/cable devices 828, additional video sources 830, and audio outputs 832 are also coupled to high performance I/O bus 806.

These elements 802–832 perform their conventional functions known in the art. In particular, network/ communication interface 824 is used to provide communication between system 800 and any of a wide range of conventional networks, such as an Ethernet, token ring, the Internet, etc. It is to be appreciated that the circuitry of interface 824 is dependent on the type of network the system 800 is being coupled to.

Mass storage 820 is used to provide permanent storage for the data and programming instructions to implement the above described functions, whereas system memory 814 is used to provide temporary storage for the data and programming instructions when executed by processor 802. I/O ports 826 are one or more serial and/or parallel communication ports used to provide communication between additional peripheral devices which may be coupled to hardware system 800.

It is to be appreciated that various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, mass storage 820, keyboard and pointing device 822, and/or display device 818 and video memory 816 may not be included in system 800. Additionally, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the method and apparatus performing a predetermined function based on information corresponding to broadcast data according to the present invention as discussed above is implemented as a series of software routines run by hardware system 800 of FIG. 8. In this embodiment, receiver 205, control logic 210, programming guide 215, and storage medium 220 of FIG. 2 are each implemented as a series of software routines. These software routines comprise a plurality or series of instructions to be executed by a processor in a hardware system, such as processor 802 of FIG. 8. Initially, the series of instructions are stored on a storage device, such as mass storage 820. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, receiver 205, control logic 210, programming guide 215, and storage medium 220 of FIG. 2 could be implemented in one or more ASICs of an additional circuit board for insertion into hardware system 800 of FIG. 8.

Thus, a method and apparatus to provide additional means by which a user can recognize and select pertinent information and entertainment is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:

receiving program data independent of a programming guide corresponding to broadcast data;

comparing the program data to search criteria to determine a matched set of target data, wherein at least a portion of the searched program data matches at least a portion of the search criteria;

accessing scheduling information in a programming guide after determining the matched set of target data;

identifying a predetermined function to be performed based on the accessing; and performing the predetermined function.

2. The method of claim 1, wherein the received information includes at least one of closed caption data, Intercast™ data, audio data, and video data.

3. The method of claim 1, wherein the searched program data is received from at least one of vertical blanking intervals, a digital channel, internet access, and telephone access.

4. The method of claim 1, wherein the programming guide comprises data provided from at least one of vertical blanking intervals, a magnetic storage medium, an optical storage medium, a digital channel, internet access, and telephone access.

5. The method of claim 1, wherein the programming guide indicates at least a time and a channel for at least one segment of at least one program, wherein the programming guide is updateable on a selectable update-interval.

6. The method of claim 1, wherein accessing the programming guide includes identifying at least one segment of at least one program currently being received which corresponds to the matched set of target data.

7. The method of claim 1, wherein accessing the programming guide includes identifying at least one segment of at least one program scheduled in the future which corresponds to the matched set of target data.

8. The method of claim 1, wherein performing the predetermined function comprises at least one of:

displaying at least one segment of at least one program;

recording at least one segment of at least one program;

blocking reception of at least one segment of at least one program; and alerting a user to at least one segment of at least one program.

9. The method of claim 1, wherein at least one of the search criteria, the predetermined function, and a set of programming guide information are determined based on a user profile.

10. The method of claim 1, wherein at least one of the searched information, the search criteria, and a set of programming guide information are received via a different source or channel from that of the corresponding broadcast data.

11. An apparatus comprising:

a receiver to receive program data independent of a programming guide corresponding to broadcast data;

a control logic, coupled to the receiver, to compare the program data to search criteria; and a programming guide, coupled to the control logic, to store programming information wherein the control logic is to access scheduling information in the programming guide if at least a portion of the searched program data matches at least a portion of the search criteria, and perform a predetermined function based on the access.

12. The apparatus of claim 11, wherein the searched program data includes at least one of closed caption data, Intercast™ data, audio data, and video data.

13. The apparatus of claim 11, wherein the searched program data is provided from at least one of vertical blanking intervals, a digital channel, internet access, and telephone access.

14. The apparatus of claim 11, wherein the programming guide comprises data provided from at least one of vertical blanking intervals, a magnetic storage medium, an optical storage medium, a digital channel, internet access, and telephone access.

15. The apparatus of claim 11, wherein the programming guide indicates at least a time and a channel for at least one segment of at least one program, wherein the programming guide is updated on at least one of a monthly basis, a weekly basis, an hourly basis, a half-hourly basis, a minute-by-minute basis, and a second-by-second basis.

16. The apparatus of claim 11, wherein the control logic is to access the programming guide to identify at least one segment of at least one program currently being received which corresponds to the matched portion of search criteria.

17. The apparatus of claim 11, wherein the control logic is to access the programming guide to identify at least one segment of at least one program scheduled in the future which corresponds to the matched portion of search criteria.

18. The apparatus of claim 11, wherein the predetermined function includes at least one of displaying at least one segment of at least one program, recording at least one segment of at least one program, blocking reception of at least one segment of at least one program, and alerting a user to at least one segment of at least one program.

19. The apparatus of claim 11, wherein at least one of the search criteria, the predetermined function, and a set of programming guide information are determined based on a user profile.

20. The apparatus of claim 11, wherein the control logic comprises:

a storage medium to store at least one of the search criteria, the predetermined function, a set of programming guide information, and a user profile; and a user interface through which a user can manipulate at least one of the search criteria, the predetermined function, the set of programming guide information, and the user profile.

21. A machine-readable storage medium having stored therein a plurality of programming instructions for use by a processor, wherein the plurality of programming instructions implements the method of:

receiving program data independent of a programming guide corresponding to broadcast data;

comparing the program data to search criteria to determine a matched set of target data, wherein at least a portion of the searched program data matches at least a portion of the search criteria;

accessing scheduling information in a programming guide after determining the matched set of target data;

identifying a predetermined function to be performed based on the accessing; and performing the predetermined function.

22. The machine-readable storage medium of claim 21, wherein receiving information comprises receiving at least one of closed caption data, Intercast™ data, audio data, and video data.

23. The machine-readable storage medium of claim 21, wherein the searched program data is received from at least one of vertical blanking intervals, a digital channel, internet access, and telephone access.

24. The machine-readable storage medium of claim 21, wherein the programming guide comprises data provided from at least one of vertical blanking intervals, a magnetic storage medium, an optical storage medium, a digital channel, internet access, and telephone access.

25. The machine-readable storage medium of claim 21, wherein the programming guide indicates at least a time and a channel for at least one segment of at least one program, wherein the programming guide is updateable on a selectable update-interval.

26. The machine-readable storage medium of claim 21, wherein accessing scheduling information in the programming guide comprises identifying at least one segment of at least one program currently being received which corresponds to the matched set of target data.

27. The machine-readable storage medium of claim 21, wherein accessing scheduling information in the programming guide comprises identifying at least one segment of at least one program scheduled in the future which corresponds to the matched set of target data.

28. The machine-readable storage medium of claim 21, wherein performing the predetermined function comprises at least one of:

displaying at least one segment of at least one program;

recording at least one segment of at least one program;

blocking reception of at least one segment of at least one program; and alerting a user to at least one segment of at least one program.

29. The machine-readable storage medium of claim 21, wherein at least one of the search criteria, the predetermined function, and a set of programming guide information are determined based on a user profile.

30. The machine-readable storage medium of claim 21, wherein at least one of the searched program data, the search criteria, and a set of programming guide information are received via a different source or channel from that of the corresponding broadcast data.

31. A system comprising:

at least one system component to receive broadcasts via at least one input, wherein broadcasts include subsidiary information;

a storage medium, coupled to the at least one system component, to store at least one of search criteria, a predetermined function, a programming guide, and a user profile; and a processor, coupled to the storage medium, to compare the subsidiary information to the search criteria, access scheduling information in the programming guide if at least a portion of the subsidiary information matches at least a portion of the search criteria, and perform the predetermined function based on the access.

* * * * *